(12) United States Patent
Wezelenburg

(10) Patent No.: US 7,657,587 B2
(45) Date of Patent: Feb. 2, 2010

(54) MULTI-DIMENSIONAL FAST FOURIER TRANSFORM

(75) Inventor: Martinus Cornelis Wezelenburg, Leuven (BE)

(73) Assignee: ARM Limited, Cambridge (GB)

( * ) Notice: Subject to any disclaimer, the term of this patent is extended or adjusted under 35 U.S.C. 154(b) by 902 days.

(21) Appl. No.: 11/201,110

(22) Filed: Aug. 11, 2005

(65) Prior Publication Data
US 2006/0253513 A1 Nov. 9, 2006

(30) Foreign Application Priority Data
May 5, 2005 (GB) .................................. 0509217.6

(51) Int. Cl.
*G06F 17/14* (2006.01)
(52) U.S. Cl. ..................................................... 708/404
(58) Field of Classification Search ........................ None
See application file for complete search history.

(56) References Cited

U.S. PATENT DOCUMENTS

| | | | |
|---|---|---|---|
| 4,450,525 A * | 5/1984 | Demuth et al. ............... | 712/243 |
| 5,093,801 A | 3/1992 | White et al. | |
| 6,157,938 A * | 12/2000 | Wu et al. ..................... | 708/404 |
| 6,675,185 B1 * | 1/2004 | Mitchell et al. .............. | 708/400 |
| 2002/0065862 A1 * | 5/2002 | Nakanishi .................... | 708/401 |
| 2004/0078405 A1 * | 4/2004 | Bhanot et al. ................ | 708/404 |

FOREIGN PATENT DOCUMENTS

| | | |
|---|---|---|
| EP | 1 271 338 | 1/2003 |
| JP | 6-110917 | 4/1994 |

OTHER PUBLICATIONS

UK Search Report for GB 0509217.6 dated Jun. 30, 2005.

* cited by examiner

*Primary Examiner*—David H Malzahn
(74) *Attorney, Agent, or Firm*—Nixon & Vanderhye P.C.

(57) ABSTRACT

A multi-dimensional FFT is calculated upon $2^n$ rows of $2^m$ data values set out end-to-end in memory by traversing the data set as a whole using stride values and block sizes which halve upon each pass through the data. As the data values represent multi-dimensional data, there are one or more dimensional boundaries within the data and as these are crossed the coefficient values being applied by the complex butterfly calculation are adjusted to take account of the manipulation being performed. The linearity of the matrix calculations underlying the butterfly calculation means that the order in which these calculations are performed is not significant and accordingly multiple passes with appropriate coefficient changes can perform a multi-dimensional calculation even if the different components of the calculation in respect of each dimension arise upon different passes through the data set.

14 Claims, 6 Drawing Sheets

MULTI-DIMENSIONAL FAST FOURIER TRANSFORM

BACKGROUND OF THE INVENTION

1. Field of the Invention

This invention relates to the field of data processing systems. More particularly, this invention relates to data processing systems for calculating Fast Fourier Transform of two or more dimensions.

2. Description of the Prior Art

The computation of Fast Fourier Transforms is a data processing requirement in many application areas. Multi-dimensional Fast Fourier Transforms are often employed in areas such as image processing. The computational overhead associated with the calculation of Fast Fourier Transforms is significant and accordingly measures which can be taken to improve the speed of Fast Fourier Transforms are advantageous. It is known to provide special purpose hardware for computing Fast Fourier Transforms, such as within digital signal processing integrated circuits. Such special purpose hardware still requires controlling and configuring for the particular computation to be performed. As the hardware becomes more specialised, the control complexity increases accordingly. This leads either to a fixed hardwired controller, which limits the applicability of the hardware specifically to "that" FFT, or to an increase in program size on a "shared resource architecture" which is not limited to the computations of only "that" FFT. Furthermore, computational cycles consumed configuring such special purpose hardware and resetting it between processing loops is a processing overhead which it is advantageous to reduce.

When computing a multi-dimensional Fast Fourier Transform in accordance with known techniques, it is known to separately compute the Fast Fourier Transform components in each dimension in sequence in order to eventually build up the multi-dimensional result. Thus, in the case of a two-dimensional Fast Fourier Transform, it would be normal to first compute all of the one-dimensional row Fast Fourier Transform results followed by all of the one-dimensional column Fast Fourier Transform results. In such a system, whilst the inner loop of the code may be implemented efficiently using either special purpose hardware (e.g. a pipeline for the FFT "butterfly"), or in the software case handcrafted/optimised code, the outer loops needed to cycle among the rows and columns consume disadvantageous additional code size overhead as well as processing cycles.

SUMMARY OF THE INVENTION

Viewed from one aspect the present invention provides a method of controlling a data processing apparatus to perform a multi-dimensional Fast Fourier Transform upon an array of data values, said method comprising:

(i) storing said array of data values within a data value memory, said array of data values having $2^n$ rows each of $2^m$ data values stored as a concatenated sequence of rows within said data value memory;

(ii) selecting an initial set of coefficient values as a working set of Fourier coefficient values to be applied to a set of said data values;

(iii) selecting an initial data address value as a working data address value;

(iv) performing a Fast Fourier Transform butterfly calculation using said working set of Fourier coefficient values upon said set of data values read from said data value memory at address values dependent upon said working data address value;

(v) storing result data values from said Fast Fourier Transform butterfly calculation in said data value memory;

(vi) updating said working set of Fourier coefficient values and said working data address value;

(vii) repeating steps (iv), (v) and (vi) until all of said data values of said $2^n$ rows have been traversed;

(viii) updating said initial set of coefficient values and said initial data address value; and (ix) repeating steps (iv) to (viii) until said multi-dimensional Fast Fourier Transform is complete.

The present invention adds a small amount of hardware support in order to make FFTs on an enhanced DSP more efficient and less expensive, especially in a software implementation thereof. The present technique recognises that the data to be manipulated may be set out in concatenated rows and processed within a single loop in a single pass using the efficient special purpose hardware subject to appropriate Fourier coefficient changes being made during the pass to take account of the multi-dimensional nature of the data being processed and the order in which it is being processed. Reducing the number of processing loops with which the special purpose hardware operates has the advantage of reducing the code size necessary to configure and control the system. Furthermore, power consumption may be reduced due to a reduced need to fetch and store instructions as the instructions for the butterfly calculation may be kept in a local loop buffer. The processing kernel used for the transform may also be more readily reused since changes in the number of dimensions to which the transform relates can be accommodated by changes in the coefficient data and data size values rather than in the looping structure of the software control. The data layout also facilitates efficient caching.

Whilst it will be appreciated that the Fourier coefficients used could be generated by special purpose hardware, or coded within the software itself, the flexibility and reusability of the technique is improved in embodiments in which sets of Fourier coefficient values are stored within a coefficient memory and said steps of selecting an initial set of coefficient values as a working set of Fourier coefficient values and of updating said working set of Fourier coefficient values comprise reading one or more Fourier coefficient values from said coefficient memory in dependence upon a coefficient value address.

The data being manipulated and subject to the Fast Fourier Transform can represent a variety of different physical or abstract entities, but in accordance with advantageous embodiments said Fourier coefficient values, which are complex numbers, are handled as a single entity associated with a single address, comprising the real and imaginary part of the complex number. The use of this single entity, rather than treating the real and imaginary parts individually improves overall processing efficiency, even in the case of manipulation of purely real data values which can advantageously be subject to pre-processing to place them into complex form, processing within that complex form and then post-processing to place them back into real form.

The present technique is particularly well suited for augmenting an address generation unit, although it also has advantages when employed within a purely software implementation. The technique is particular well suited to allow for the efficient computation of a software FFT on a resource shared data-path, while it also offers advantages when employed in a dedicated hardware FFT processing core. Important advantages of at least preferred embodiments are that: 1) the data value addresses and their strides are computed within a single loop over all FFT dimensions without additional control; 2) the coefficient value addresses and stride values are computed within a single loop over all FFT dimensions without additional control.

An advantageously simplified implementation of the present technique is one in which said Fast Fourier Transform butterfly calculation is performed upon data values stored within said data value memory at memory addresses separated by a stride value, said stride value being halved each time all of said $2^n$ have been traversed in steps (iv), (v), (vi) and (vii).

As previously mentioned, the Fourier coefficient values used vary as the data set is traversed in order to take account of the multi-dimensional nature of the data being represented. In accordance with advantageous embodiments, said Fourier coefficient values used in said Fast Fourier Transform butterfly calculation when traversing said $2^n$ rows of data values comprise a sequence of complex numbers on a unit circle, said sequence of complex numbers corresponding to complex rotation by a sequence of angles, each of said sequence of angles differing by a complex operation angle starting with $\pi$, said complex separation angle halving with each traverse of said $2^n$ rows until a dimensional boundary is crossed in a level of Fast Fourier Transform being performed at which point said complex separation angle is reset to $\pi$ (the coefficient resets to $2\pi$ or 0: complex number $\{1,0\}$, its initial stride is $\pi$, complex number $\{-1,0\}$, halving to $\pi/2, \pi/4, \ldots$ etc until reset at the same time as the starting angle is reset).

As previously mentioned, the Fourier coefficient values could be generated by special purpose hardware or hard coded into the software control, but in preferred embodiments are stored within a coefficient memory. Within such embodiments, it is preferred that said Fourier coefficient values are stored in concatenated groups ($[\{1,0\}], [\{0,j\}], [\exp(j\pi/4), \exp(j3\pi/4)], [\exp(j\pi/8), \exp(j3\pi/8), \exp(j5\pi/8), \exp(j7\pi/8)], [\{1,3,5,7,9,11,13,15\}/16], [\{1,3,5,\ldots,31\}/32], [\{\ldots\}/64], \ldots, [\{\ldots\}/2^{max(n,m)}]$) within said coefficient memory in order of decreasing complex separation angle, said address calculation hardware incrementing said coefficient value address as data values of said $2^n$ rows are traversed and resetting said coefficient value address to a start of said coefficient memory as dimensional boundaries are crossed.

Whilst it will be appreciated that the present technique is applicable to multi-dimensional Fast Fourier Transforms with a wide range in the number of dimensions, the technique is particularly well suited to two-dimensional Fast Fourier Transforms which typically include crossing one dimensional boundary in Fourier space as the data set is traversed. The need to perform two-dimensional transforms is relatively common.

Whilst it will be appreciated that the Fast Fourier Transform butterfly calculation could have a wide variety of radix values, such as 2, 4, 8, etc, the technique is well suited to radix 2 calculations, in which case the set of Fourier coefficients comprise one Fourier coefficient used at any given time.

Viewed from another aspect the present invention provides apparatus for performing a multi-dimensional Fast Fourier Transform upon an array of data values, said apparatus comprising:

(i) a data value memory operable to store said array of data values, said array of data values having $2^n$ rows each of $2^m$ data values stored as a concatenated sequence of rows within said data value memory;

(ii) an initial coefficient value selector operable to select an initial set of coefficient values as a working set of Fourier coefficient values to be applied to a set of said data values;

(iii) an initial data address value selector operable to select an initial data address value as a working data address value;

(iv) a calculation unit operable to perform a Fast Fourier Transform butterfly calculation using said working set of Fourier coefficient values upon said set of data values read from said data value memory at address values dependent upon said working data address value, result data values from said Fast Fourier Transform butterfly calculation being stored in said data value memory;

(v) a working value updater operable to update said working set of Fourier coefficient values and said working data address value;

(vi) a first controller operable to control repeating of said calculating, said storing and said working value updating until all of said data values of said $2^n$ rows have been traversed;

(vii) an initial value updater operable to update said initial set of coefficient values and said initial data address value; and (viii) a second controller operable to control repeating of said calculating, said storing and said working value updating and said initial value updating until said multi-dimensional Fast Fourier Transform is complete.

Viewed from a further aspect the present invention provides a program product carrying a program operable to control a data processing apparatus to perform a multi-dimensional Fast Fourier Transform upon an array of data values, said multi-dimensional Fast Fourier Transform comprising:

(i) storing said array of data values within a data value memory, said array of data values having $2^n$ rows each of $2^m$ data values stored as a concatenated sequence of rows within said data value memory;

(ii) selecting an initial set of coefficient values as a working set of Fourier coefficient values to be applied to a set of said data values;

(iii) selecting an initial data address value as a working data address value;

(iv) performing a Fast Fourier Transform butterfly calculation using said working set of Fourier coefficient values upon said set of data values read from said data value memory at address values dependent upon said working data address value;

(v) storing result data values from said Fast Fourier Transform butterfly calculation in said data value memory;

(vi) updating said working set of Fourier coefficient values and said working data address value;

(vii) repeating steps (iv), (v) and (vi) until all of said data values of said $2^n$ rows have been traversed;

(viii) updating said initial set of coefficient values and said initial data address value; and (ix) repeating steps (iv) to (viii) until said multi-dimensional Fast Fourier Transform is complete.

The above, and other objects, features and advantages of this invention will be apparent from the following detailed description of illustrative embodiments which is to be read in connection with the accompanying drawings.

DESCRPTION OF THE PREFERRED EMBODIMENTS

Figure 1:
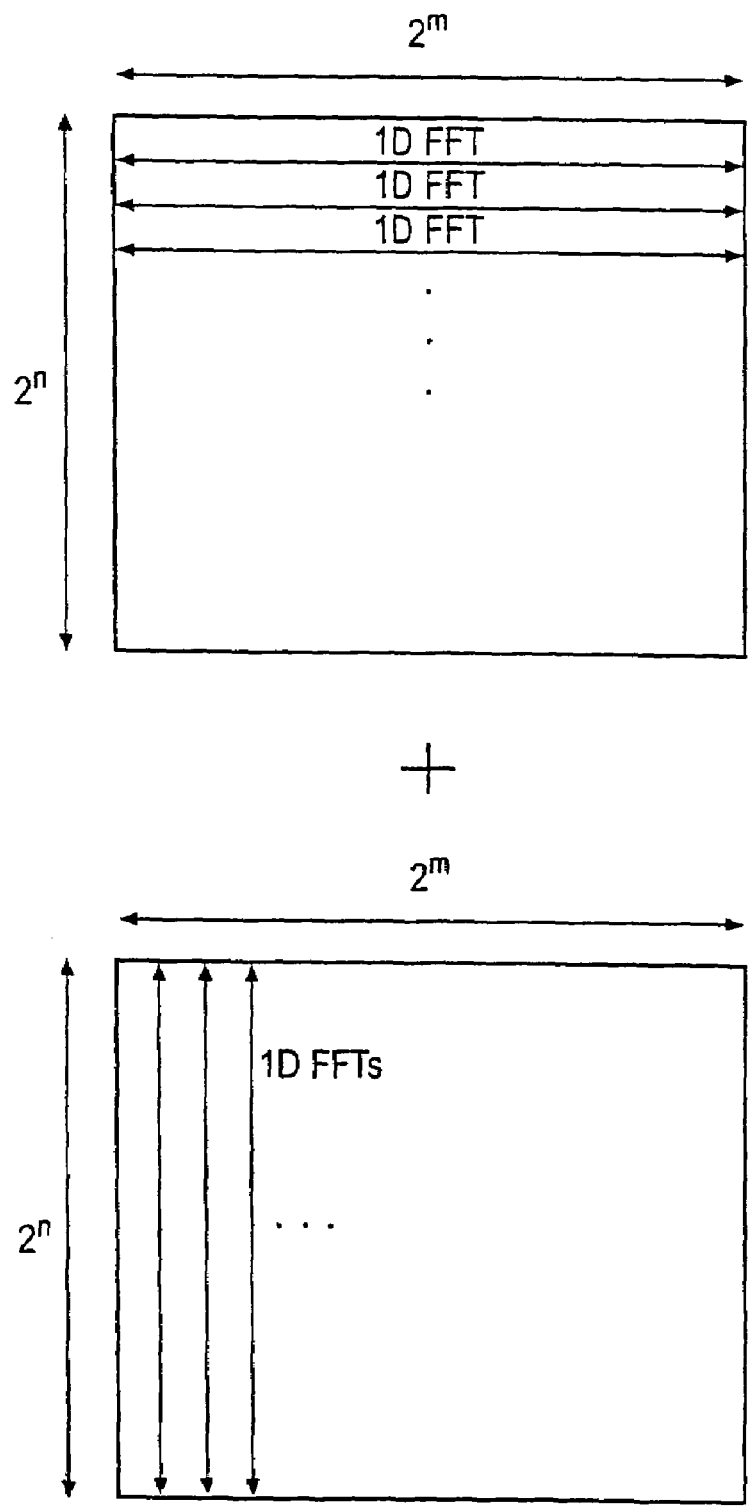
FIG. 1 schematically illustrates a known methodology for performing a 2D FFT.

FIG. 1 illustrates an array of data comprising $2^n$ rows of data each containing $2^m$ data values to be subject to a two-dimensional FFT. As a first stage, a sequence of one-dimensional FFTs are performed upon each data row in turn. Subsequently, a separate sequence of one-dimensional FFTs are calculated down each column within the data. This approach requires a relatively large looping structure which represents a disadvantageous overhead.

Figure 2:
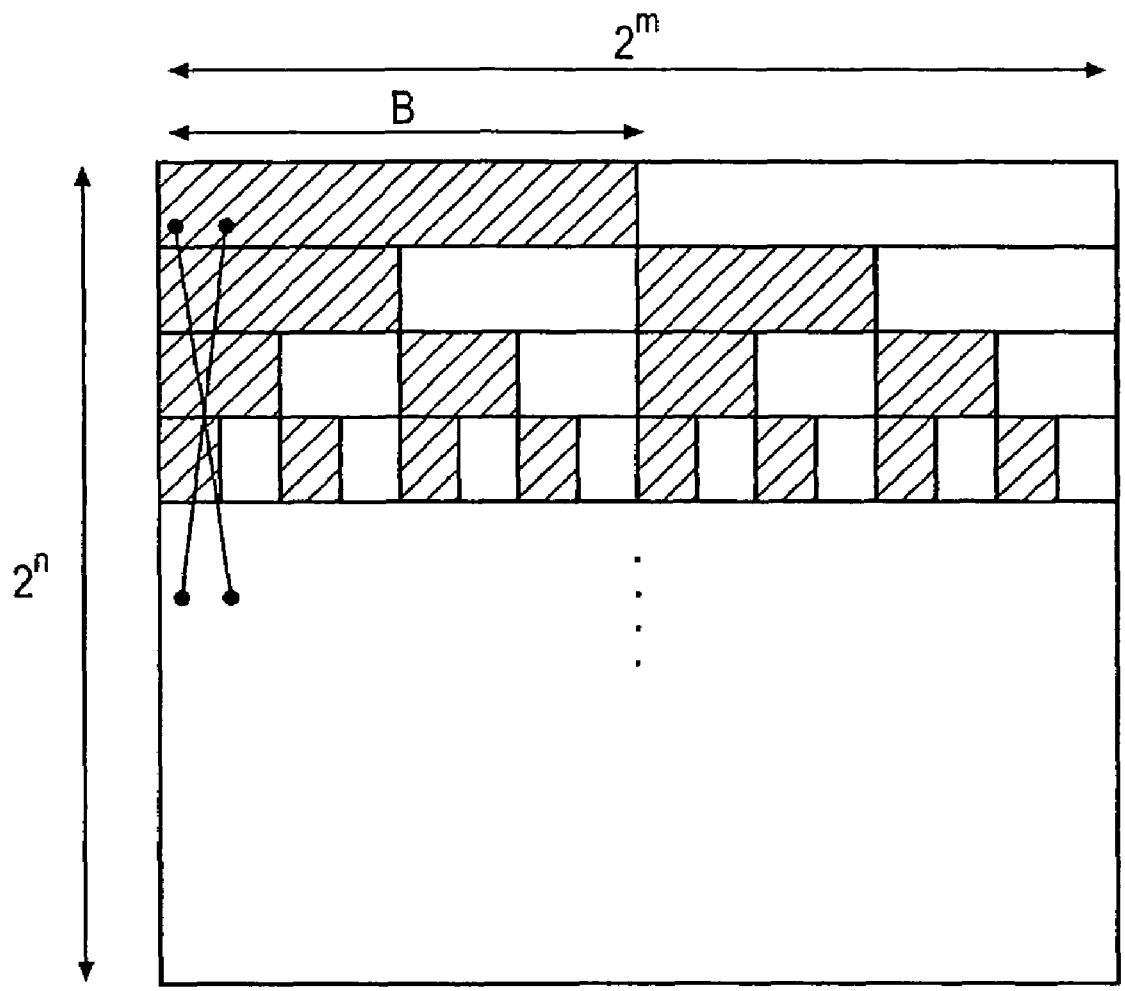
FIG. 2 schematically illustrates a multi-dimensional FFT being performed in accordance with the present techniques.

FIG. 2 schematically illustrates an array of data comprising $2^n$ rows each containing $2^m$ data values laid out contiguously within memory. With the contiguous layout of this example, the rows are in sequence and abut one another. This arrangement allows standard caching and page tabling techniques to be employed with advantage. The butterfly is depicted as a cross, retrieving data from address zero, row zero and address zero, row $2^{(n-1)}$, e.g. "halfway". It then proceeds over all addresses of the row and then continues with the next row until it reaches address $2^m-1$ of row $2^{(n-1)}$.

The initial block length is $2^{(n+m)}$, i.e. the whole data-set. The initial stride (sampling distance between the points in the butterfly) is $2^{(n+m+1)}$. For radix-2 the stride is half of the block-length. FIG. 2 depicts the recursive nature of the FFT, but in the format of a 1D FFT. At iteration one there is one block and N/2 butterflies, and hence one coefficient. At iteration two there are two blocks, each with N/4 butterflies, and for each block a different coefficient. This goes on until there are N/2 blocks, each with a single butterfly, and a specific coefficient. The behaviour of the address updates is incrementing (by one) until the block is exhausted, then jump to the next block. (This depends on the FFT format (multiplier before or after the butterfly add). There are four permutations, but in accordance with the earlier example, this is simplified by having a special coefficient order, such that the address increment is always one for coefficient and data (with the occasional data reset to jump over the block), other varianets let the data address jump over the blocks before incrementing etc).

It will be appreciated that since the data values represent multi-dimensional data, one or more dimensional boundaries within Fourier space will have been crossed as the full data set is traversed. When each of these dimensional boundaries is crossed, the coefficient address generation is reset to take account of the dimensional boundary jump. However, the addressing of the data values within the data memory can continue sequentially until the full data set is traversed. Thus, by laying out the data with the rows arranged end-to-end the full data set can be traversed in a single sequence with appropriate Fourier coefficient changes to perform a multi-dimensional FFT with a simplified looping and control structure. When the first pass through the data set has been completed, the block size B and stride length are each halved and a new set of initial coefficient values is selected. The data is then traversed again. By making multiple passes through the data set in this way, the complete required FFT result can eventually be calculated.

The calculation result values as each butterfly calculation is performed must be stored and are advantageously stored back into the same locations from which they were read. However, it will be appreciated that different storage locations could be used for calculated values if desired. In particular in-line bit-reversed storage, resulting in an in-order output format rather than a transposed-bit-reversed output format is easily achieved, because the required address resets coincide with the decision moments already accounted for in the address generator depicted in FIG. 5.

Figure 3:
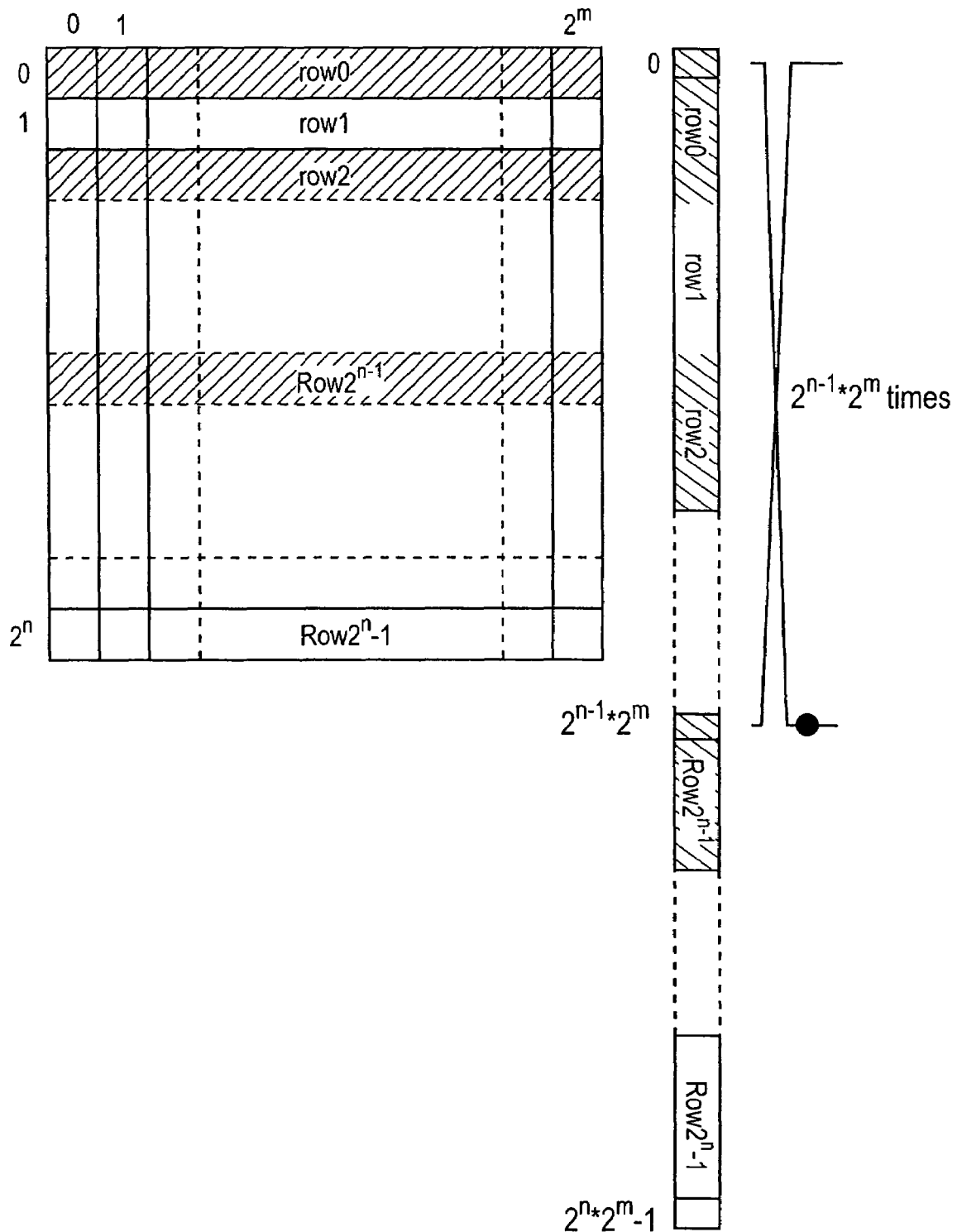
FIG. 3 is an alternative representation of FIG. 2 showing the relationship between the data laid out as an array and the data laid out in a linear fashion within memory.

FIG. 3 schematically illustrates and alternative view of the system described in relation to FIG. 2. In particular, the rows of data are illustrated in FIG. 3 as laid out end-to-end and being subject to the first pass through the data. Upon this first pass, the stride value applied is half the data set size. As illustrated, the required butterfly calculation is then performed for each row.

Figure 4:
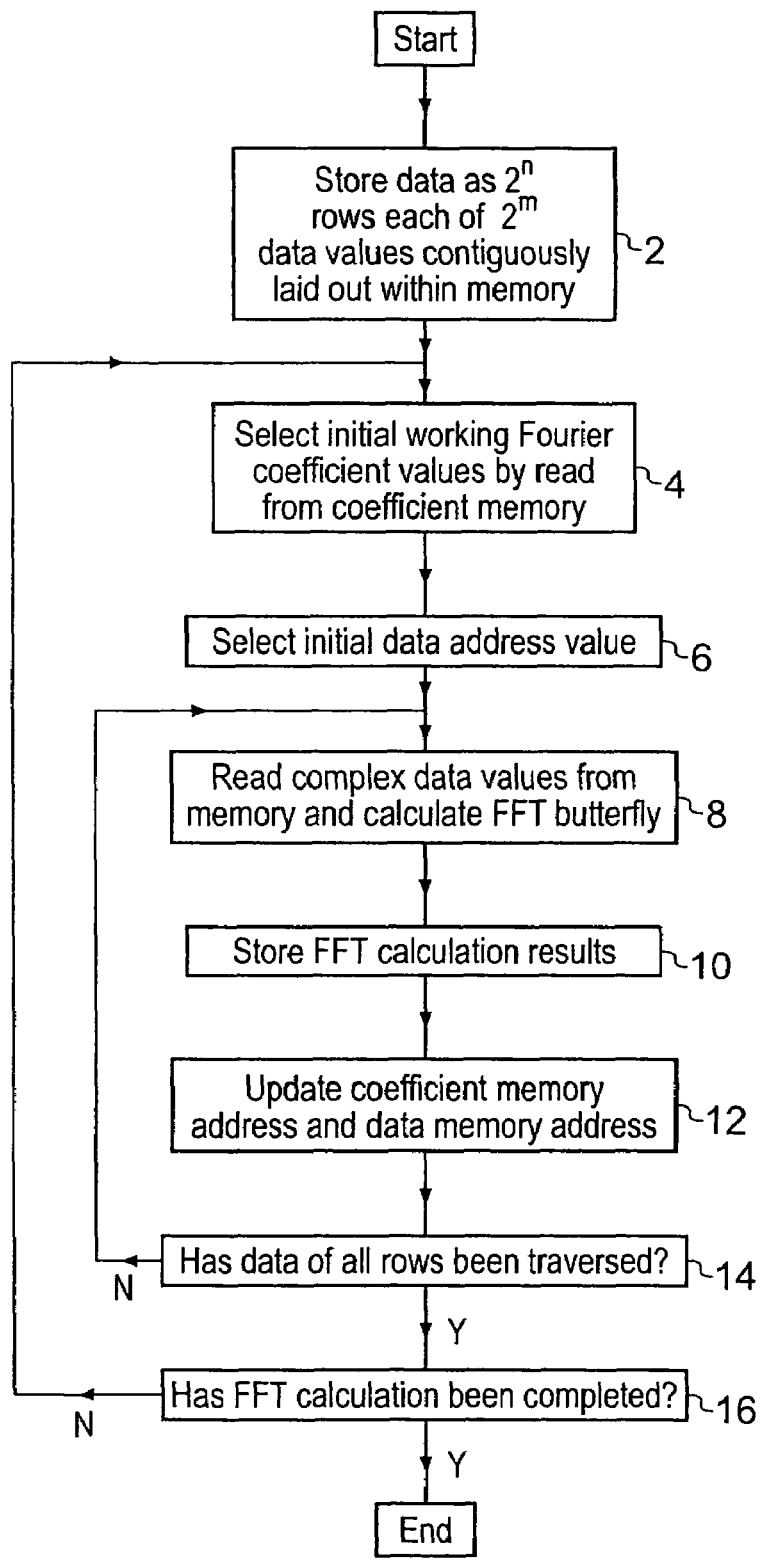
FIG. 4 is a flow diagram schematically illustrating the operation of the present technique.

FIG. 4 is a flow diagram schematically illustrating the present technique. At step 2, the data values to be manipulated are laid out in memory as $2^n$ rows each containing $2^m$ data values. The calculation performed in this example is a radix two butterfly calculation as is illustrated in FIGS. 2 and 3. It will be appreciated that higher radix values (such as 4, 8, etc) could be used if desired. In accordance with a radix value of two, step 4 selects an initial working Fourier coefficient value by reading this from a coefficient memory address pointed to by a coefficient memory address value. Step 6 selects an initial data address value which points to the start of the data values to be manipulated within memory. Step 8 performs a read of the complex data values from memory in accordance with the current data address value and performs a radix two FFT butterfly calculation upon these data values using the current Fourier coefficient. Step 10 stores the calculated FFT result values back to memory. Step 12 updates the coefficient memory address and the data memory address as required to point to the next data memory address position to be manipulated and the appropriate address from which the coefficient value to be applied should be taken.

It will be appreciated that the data address value will typically change upon each pass through the inner loop with the coefficient memory address value changing only when a block of length B is exhausted. As will be appreciated by those in the field, an FFT calculation can be considered as an iterative computation, combining data pairs, followed by a sequence of complex rotations to the data values with the rotations being applied increasing through a sequence of angles with those angles being separated by a complex separation angle which halves with each pass through the data. This sequence of complex rotations to be applied and reduction in separation angle is reflected in the coefficient values stored within the coefficient memory and selected to be applied for each data value as a FFT butterfly calculation is performed.

In contrast to a conventional one-dimensional FFT calculation in which the separation angle either monotonically increases or decreases as the calculation progresses, typical embodiments the present technique in which multi-dimensional data is traversed in a single pass use coefficient values which are effectively reset as each dimensional boundary is crossed to reflect the appropriate relationship between the data values being manipulated with the current stride and the dimensional relationship of those data values.

Step 14 checks whether all of the rows within the data set have been traversed and if not returns processing to step 8 for the next butterfly calculation to be performed. It will be appreciated that steps 8, 10, 12 and 14 may be implemented in special purpose hardware such that a looping structure does not have to be supported within control software thereby reducing the looping control overhead in the case of a two-dimensional FFT to a single loop.

If the determination at step 14 was that all of the rows within the data set have been traversed, then processing proceeds to step 16 at which it is determined whether or not the full FFT calculation has been completed. If the full FFT calculation has not been completed, then processing returns to step 4 where new initial working Fourier coefficient values are selected and the block size and stride lengths are halved. Traversing of the data step then is repeated using these new coefficient values, block size and stride length perimeters.

It will be appreciated by those in the field that such behaviour may be represented in pseudo code. Such pseudo code may be implemented in hardware, partially in hardware and partially in software, or entirely in software as desired or appropriate. Such as pseudo code representation is given below for a radix-2 FFT:

Pseudo code of the 2D-FFT algorithm and the ACU instruction "adr_data( )" (with state) is specified below of the butterfly (the others are at stride B) and the address of the set of coefficient value 20 which are respectively applied to a data memory and a coefficient value memory to return data values and coefficient values to use by a FFT butterfly calculation circuit (not illustrated). A main path 22, 24, 26, 28, 30, 32 through the address calculation circuit serves to generate an incrementing sequence of data addresses to be applied to recover data values to be manipulated. As each such value is generated a comparator 34 serves to identify whether the end of a current block being processed has been reached. When such a block end has been reached, then the current address value is advanced by the block value using the adder 28. The end of block indicator value $I_o\_$ end is also advanced by double the current block value using adder 36 within the data path which calculates the block indicator end point. The coefficient value address generated by path 38, 40, 42, 44, 46 also advances by one increment when the next block to the process is reached.

In comparison to hardware that would generate the addresses for the data and sets of coefficient values to perform a one-dimensional FFT calculation, additional circuit elements within the address generation logic used to support the multi-dimensional nature of the current technique are illus-

```
B=N>>1;         /* Block step/stride value, halves at each iteration */
i0_end = B;     /* Block end value, halves at each iteration       */
i0 = 0;         /* Data starting address, reset at each iteration  */
adr = 0;        /* Coefficient address, bounded by mask            */
mask = 0;       /* Mask value, reset at each dimension boundary    */
for (j=0;j<(N>>1)*NU;j++)
    {
    data0 = x[i0];
    data1 = x[i0+B];
    coef = load_coefficients(adr);
    Radix2_OptimoDE_FFT_butterfly(coef,data0,data1);
    ACU_adr_data(N,N0,&B,&i0,&i0_end,&adr,&mask);
    }
static void adr_data(
        const Ushort    N,
        const Ushort    N0,
        Ushort          *B,
        Ushort          *i0,
        Ushort          *i0_end,
        Ushort          *adr,
        Ushort          *mask)
{
*i0++;
if (*i0 == *i0_end)        /* detect end of block, if TRUE then       */
    {
    *adr += 1;             /* Select a new coefficient                */
    *i0 += B;              /* Jump to the next block start            */
    *i0_end += (B<<1);     /* Set the new block end                   */
    }
*adr &= mask;              /* Use the 2^k property for simple reset   */
if (*i0 == N)              /* Detect end if iteration, if TRUE then   */
    {
    B>>=1;                 /* Half the block size                     */
    *i0=0;                 /* Reset to the beginning of the data      */
    *i0_end=(B<<1);        /* Set the block end value                 */
    mask = (mask<<1) | 1;
/* This mask reset is the only thing specific for 2D-FFT */
    if (B==N0)             /* Detect end of dimension, if TRUE then   */
        mask=0;            /* Force coefficients to large angles      */
    }
return;
}
```

Figure 5:
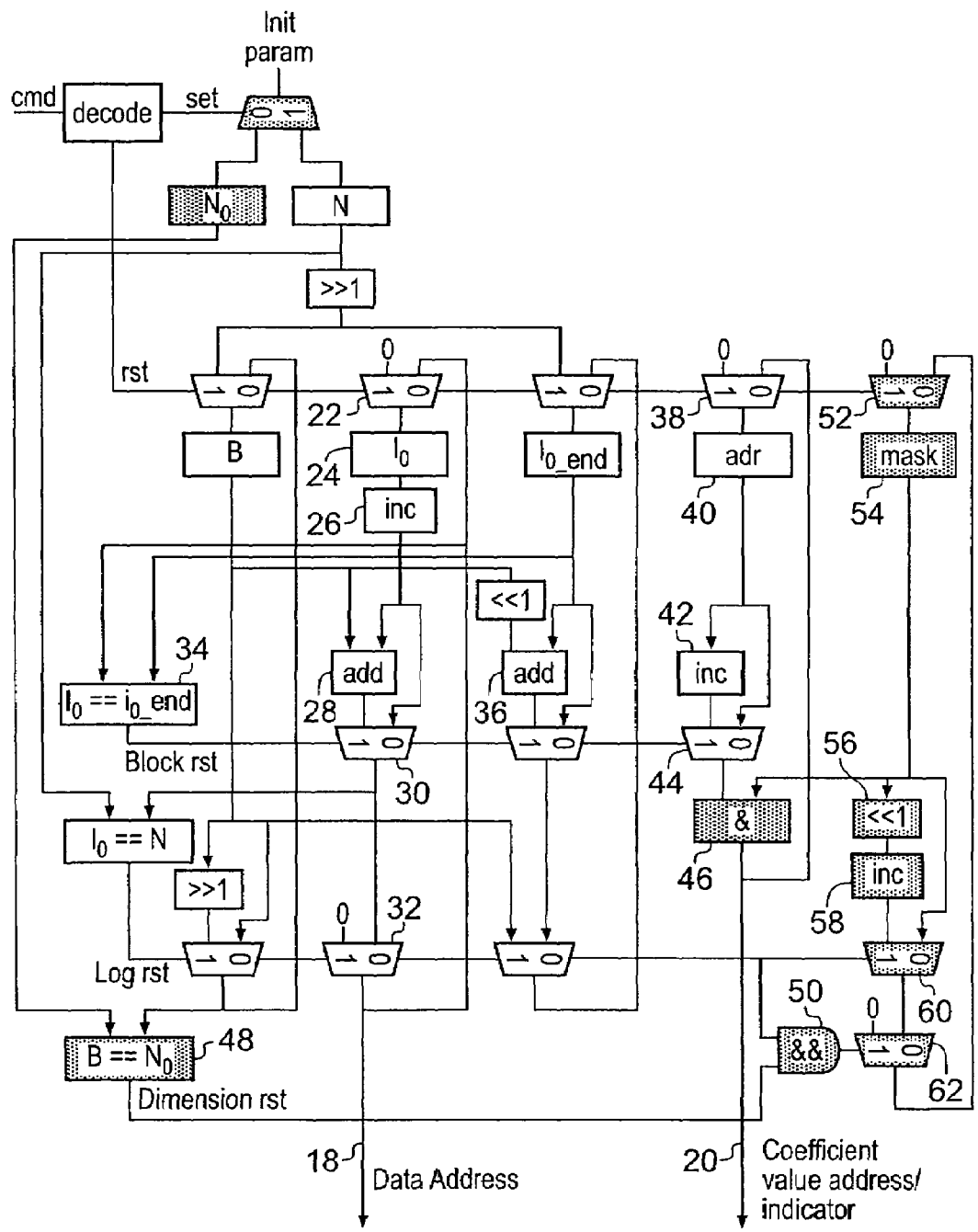
FIG. 5 schematically illustrates an address calculation portion of special purpose hardware for performing a multi-dimensional FFT in accordance with the present technique.

FIG. 5 schematically illustrates an address calculation unit for use in a special purpose hardware supported implementation of the present technique. In particular, this address calculation unit generates a data address 18 of the first sample trated in shaded form within FIG. 5. These additional elements include a comparator 48 which serves to detect when the block size reaches a value indicative of a dimensional boundary being crossed in the level of FFT processing being performed. As an example, in a two-dimensional FFT a point half way through the total number of traverses of the data set, the boundary between the levels of FFT will be crossed and the coefficient values being applied accordingly need to be adjusted to use an initial starting complex separation angle for the FFT coefficients. This resetting behaviour at the dimensional boundary crossing is achieved using the AND gate 50 in conjunction with an incrementing mask value circulating around a mask path 52, 54, 56, 58, 60, 62. This mask value is used by the AND circuit 46 to recirculate the address value being incremented up to maximum set by the mask as the address value is advanced in accordance with the block reset signals generated.

It will be appreciated that the example address calculation unit of FIG. 5 is only one example embodiment of how such an address calculation unit may be provided within an at least partially hardware supported implementation.

Figure 6:
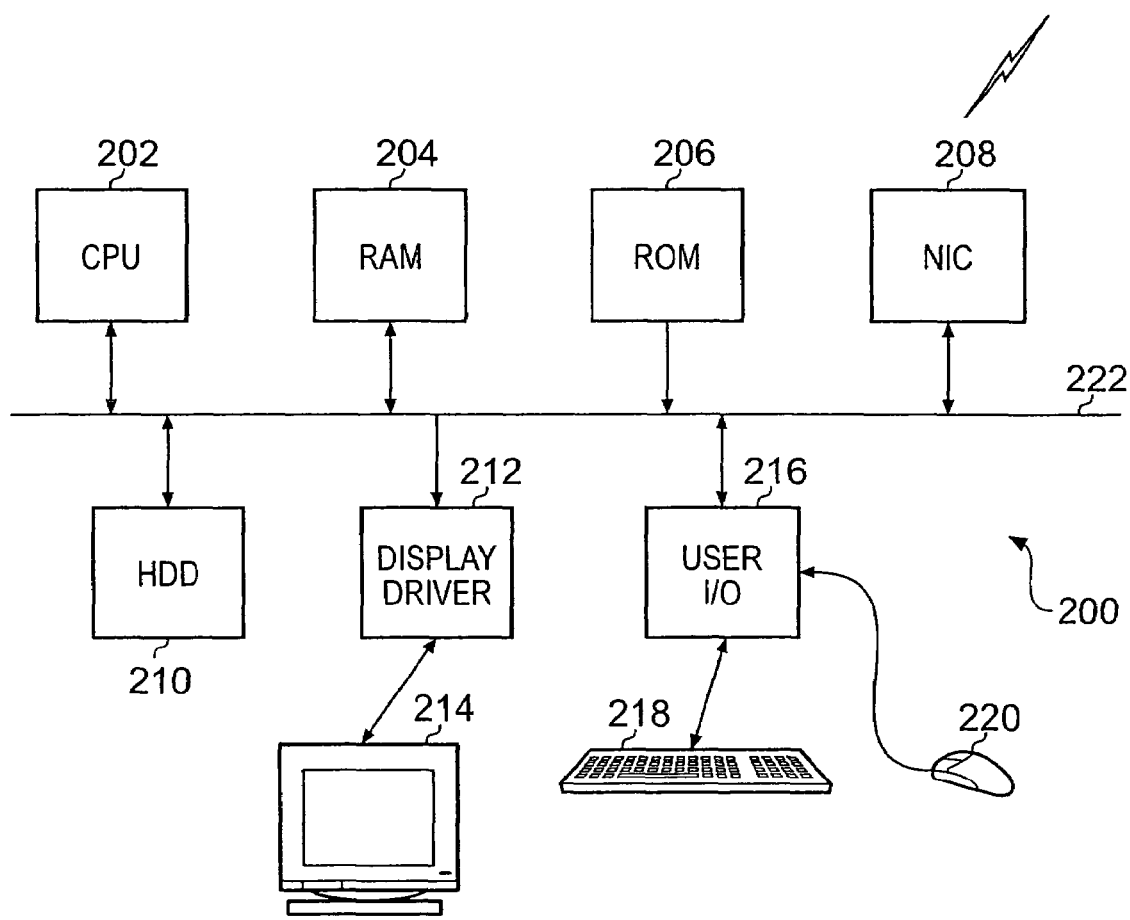
FIG. 6 is a diagram schematically illustrating a general purpose computer which may be used to implement a software embodiment of the present technique as an integral part of the CPU depicted in FIG. 6.

FIG. 6 schematically illustrates a general purpose computer 200 of the type which may be used to implement the present technique in a software only implementation. Such a general purpose computer may also be used in conjunction with a partially hardware supported FFT embodiment or with a fully hardware supported embodiment in order to provide supervision or high level control of the processing.

The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail, herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of controlling a data processing apparatus to perform a multi-dimensional Fast Fourier Transform upon an array of data values, said method comprising:
   (i) storing said array of data values within a data value memory, said array of data values having $2^n$ rows each of $2^m$ data values stored as a concatenated sequence of rows within said data value memory;
   (ii) selecting an initial set of coefficient values as a working set of Fourier coefficient values to be applied to a set of said data values;
   (iii) selecting an initial data address value as a working data address value;
   (iv) performing a Fast Fourier Transform butterfly calculation using said working set of Fourier coefficient values upon said set of data values read from said data value memory at address values dependent upon said working data address value;
   (v) storing result data values from said Fast Fourier Transform butterfly calculation in said data value memory;
   (vi) updating said working set of Fourier coefficient values and said working data address value;
   (vii) repeating steps (iv), (v) and (vi) until all of said data values of said $2^n$ rows have been traversed;
   (viii) updating said initial set of coefficient values and said initial data address value; and
   (ix) repeating steps (iv) to (viii) until said multi-dimensional Fast Fourier Transform is complete.

2. Apparatus for performing a multi-dimensional Fast Fourier Transform upon an array of data values, said apparatus comprising:
   (i) a data value memory operable to store said array of data values, said array of data values having $2^n$ rows each of $2^m$ data values stored as a concatenated sequence of rows within said data value memory;
   (ii) an initial coefficient value selector operable to select an initial set of coefficient values as a working set of Fourier coefficient values to be applied to a set of said data values;
   (iii) an initial data address value selector operable to select an initial data address value as a working data address value;
   (iv) a calculation unit operable to perform a Fast Fourier Transform butterfly calculation using said working set of Fourier coefficient values upon said set of data values read from said data value memory at address values dependent upon said working data address value, result data values from said Fast Fourier Transform butterfly calculation being stored in said data value memory;
   (v) a working value updater operable to update said working set of Fourier coefficient values and said working data address value;
   (vi) a first controller operable to control repeating of said calculating, said storing and said working value updating until all of said data values of said $2^n$ rows have been traversed;
   (vii) an initial value updater operable to update said initial set of coefficient values and said initial data address value; and
   (viii) a second controller operable to control repeating of said calculating, said storing and said working value updating and said initial value updating until said multi-dimensional Fast Fourier Transform is complete.

3. An apparatus as claimed in claim 2, comprising a coefficient memory for storing said sets of Fourier coefficient values wherein said initial coefficient value selector is configured to select an initial set of coefficient values as a working set of Fourier coefficient values and said working value update is configured to update said working set of Fourier coefficient values by reading one or more Fourier coefficient values from said coefficient memory in dependence upon a coefficient value address.

4. An apparatus as claimed in claim 3, wherein said working value updater uses address calculation hardware configured to updates said working address value, and wherein said address calculation hardware calculates a new coefficient value address from which said working set of Fourier coefficient values is read when updating said working set of Fourier coefficient values.

5. An apparatus as claimed in claim 3, wherein said working value updater uses address calculation hardware configured to updates said working address value and said initial value updater uses said address calculation hardware to updates said initial set of coefficient values and said initial data address value and said Fourier coefficients values used in said Fast Fourier Transform butterfly calculation when traversing said $2^n$ rows of data values comprise a sequence of complex numbers on a unit circle, said sequence of complex numbers corresponding to complex rotation by a sequence of angles, each of said sequence of angles differing by a complex separation angle starting with $\pi$, said complex separation angle halving with each traverse of said $2^n$ rows until a dimensional boundary is crossed in a level of Fast Fourier Transform being performed at which point said complex separation angle is reset to $\pi$ and wherein said Fourier coefficient values are stored within said coefficient memory in concatenated groups in order of decreasing complex separation angle, said address calculation hardware incrementing said coefficient value address as data values of said $2^n$ rows are traversed and resetting said coefficient value address to a start of said coefficient memory when said dimensional boundary is crossed.

6. An apparatus as claimed in claim 3, wherein said Fourier coefficient values are complex values having a real part and an imaginary part and said data values are complex data values having a real part and an imaginary part.

7. An apparatus as claimed in claim 2, wherein said Fast Fourier Transform butterfly calculation is performed upon data values stored within said data value memory at memory addresses separated by a stride value, said stride value being halved each time all said data values of said $2^n$ rows have been traversed.

8. An apparatus as claimed in claim 2, wherein said Fourier coefficients values used in said Fast Fourier Transform butterfly calculation when traversing said $2^n$ rows of data values comprise a sequence of complex numbers on a unit circle, said sequence of complex numbers corresponding to complex rotation by a sequence of angles, each of said sequence of angles differing by a complex separation angle starting with $\pi$, said complex separation angle halving with each traverse of said $2^n$ rows until a dimensional boundary is crossed in a level of Fast Fourier Transform being performed at which point said complex separation angle is reset to $\pi$.

9. An apparatus as claimed in claim 2, wherein said multi-dimensional Fast Fourier Transform is a two-dimensional Fast Fourier Transform including crossing one dimensional boundary in a level of Fast Fourier Transform being performed.

10. An apparatus as claimed in claim 2, wherein said Fast Fourier Transform butterfly calculation is a radix two calculation and said working set of Fourier coefficients comprise one Fourier coefficient.

11. An apparatus as claimed in claim 2, where the input data set consists of $2^n$ rows of $2^m$ values each being a real number, and where a real-data Fast Fourier Transform is computed by interpreting the input data set as $2^n$ rows of $2^{m-1}$ complex values with real and imaginary parts on alternating addresses, and where the final real-data Fast Fourier Transform outputs are recovered from the $2^n$ rows of $2^{m-1}$ complex-data Fast Fourier Transform by post-processing.

12. An apparatus as claimed in claim 2, wherein said working value updater uses address calculation hardware configured to updates said working address value.

13. An apparatus as claimed in claim 12, wherein said initial value updater uses said address calculation hardware to updates said initial set of coefficient values and said initial data address value.

14. A program product comprising a computer readable storage medium carrying a program operable to control a data processing apparatus to perform a multi-dimensional Fast Fourier Transform upon an array of data values, said multi-dimensional Fast Fourier Transform comprising:

(i) storing said array of data values within a data value memory of said data processing apparatus, said array of data values having $2^n$ rows each of $2^m$ data values stored as a concatenated sequence of rows within said data value memory;

(ii) selecting an initial set of coefficient values as a working set of Fourier coefficient values to be applied to a set of said data values;

(iii) selecting an initial data address value as a working data address value;

(iv) performing a Fast Fourier Transform butterfly calculation using said working set of Fourier coefficient values upon said set of data values read from said data value memory at address values dependent upon said working data address value;

(v) storing result data values from said Fast Fourier Transform butterfly calculation in said data value memory;

(vi) updating said working set of Fourier coefficient values and said working data address value;

(vii) repeating steps (iv), (v) and (vi) until all of said data values of said $2^n$ rows have been traversed;

(viii) updating said initial set of coefficient values and said initial data address value; and (ix) repeating steps (iv) to (viii) until said multi-dimensional Fast Fourier Transform is complete.

* * * * *